INVENTORS: H. A. PIDGEON
J. O. McNALLY
BY
ATTORNEY

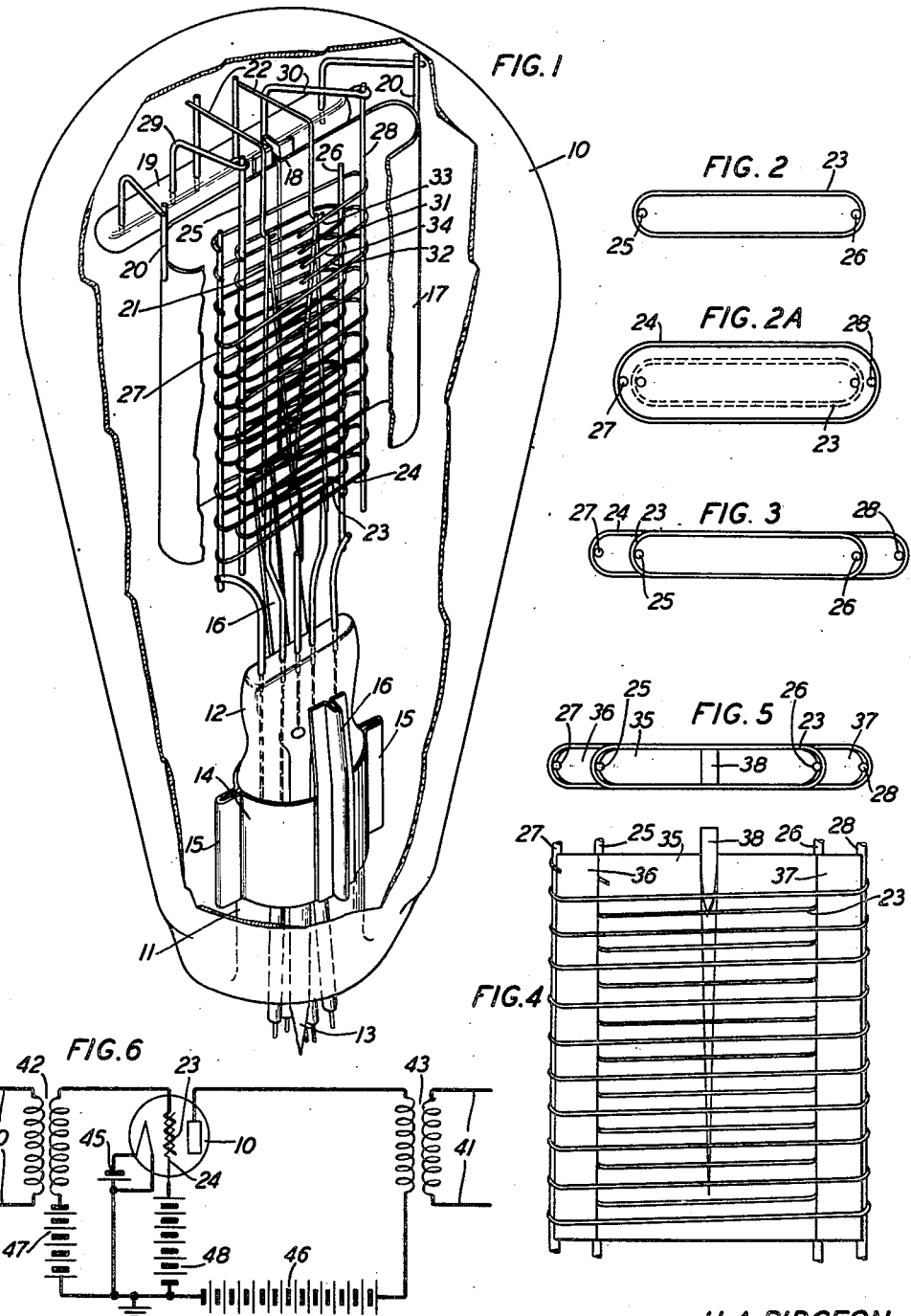

Aug. 1, 1933.                H. A. PIDGEON ET AL                1,920,274
                              WAVE TRANSLATING SYSTEM
                          Filed June 5, 1931          3 Sheets-Sheet 3

INVENTORS: H. A. PIDGEON
           J. O. McNALLY
BY
   ATTORNEY

Patented Aug. 1, 1933

1,920,274

UNITED STATES PATENT OFFICE 1,920,274

WAVE TRANSLATING SYSTEM

Howard A. Pidgeon and James O. McNally, Maplewood, N. J., assignors to Bell Telephone Laboratories, Incorporated, New York, N. Y., a Corporation of New York Application June 5, 1931. Serial No. 542,252

8 Claims. (Cl. 179—171.)

This invention relates to energy translating systems involving electric space discharge devices, as, for example, thermionic vacuum tube amplifiers.

An object of the invention is to increase the useful power output economically obtainable from such systems.

We have discovered that this end can be attained by operating a vacuum tube having a space-charge grid in coplanar relation with the control grid, (as for example the coplanar grid tube disclosed in our copending application Serial No. 368,647, filed June 5, 1929), of which the present application is a continuation in part, simultaneously as a space-charge grid tube and as a power tube with a high value of control grid negative biasing potential and with a control grid input voltage wave of large amplitude (i.e. with large grid swing) and with the space-charge grid (in the plane of the control grid) maintained at a high positive potential.

In one aspect the invention is a circuit comprising such a vacuum tube and means for conditioning the tube for such operation.

Other objects and aspects of the invention will be apparent from the following description and claims:

Fig. 1 shows in perspective the complete assembly of a discharge device embodying a coplanar grid arrangement well adapted for use in practicing this invention;

Figs. 2 and 2—A illustrate the formation of the two grids prior to arranging them in operative relation;

Fig. 3 is a plan view of the two grids combined into a unitary structure with the lateral wires in two parallel planes;

Fig. 4 illustrates a winding form for constructing the two grids as a unit;

Fig. 5 is an end view of the winding form shown in Fig. 4;

Fig. 6 is a circuit diagram of a system embodying the invention; and

Figure 7:
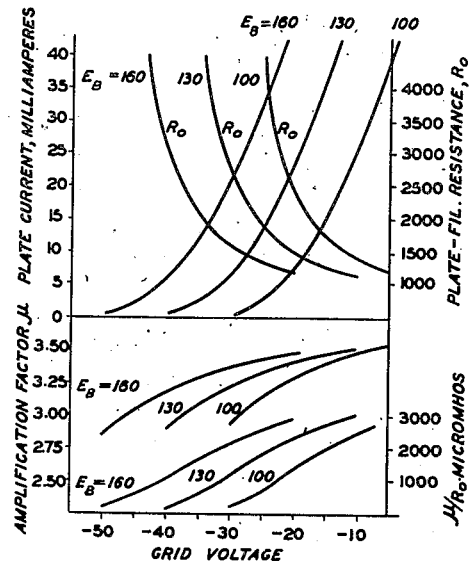
Figs. 7 to 14 show curves for facilitating explanation of the invention.

In the drawings an electron discharge device comprises a glass enclosing vessel 10 having an inwardly projecting stem 11. The stem is provided with a press portion 12 supporting the sealed leading-in wires and a small diameter tubulation 13 extends from the interior of the stem for evacuating the vessel 10. A metallic collar 14 encircles the stem and is frictionally secured thereto by suitable corrugations 15. A plurality of upright arms 16 of T-shaped cross-section are attached to the collar and support a flattened cylindrical metallic plate electrode or anode 17 formed of two similar portions of U-shaped cross-section, each portion having outwardly bent longitudinal extensions 18 which are joined together at their abutting surfaces by inserting the extensions 18 into the grooved portion of the T-shaped arms 16 and rigidly securing them to the arms by crimping or spot-welding. An elongated glass bead 19 extends along one edge of the plate 17 and is attached thereto by supporting wires 20. A flat or plane filament or cathode 21 of M shape is attached to the respective leading-in wires projecting from the press portion 12 and is resiliently supported in a vertical plane parallel to the plate electrode surfaces by hooks 22 embedded in the glass bead 19.

Interposed between the cathode and anode and suitably spaced with respect thereto are two coplanar elements or grid electrodes 23 and 24. These electrodes are formed of continuous wire helices of flattened contour to conform to the shape of the plate electrode 17 and are attached to parallel supporting wires 25, 26, 27 and 28 respectively. The smaller grid 23 is supported in operative relation to the cathode, anode and grid 24 by a leading-in wire attached to the supporting wire 26 while the supporting wire 25 loosely extends through the guiding member 29 embedded in the insulating bead 19. The larger grid 24 is supported at one end by the leading-in wire attached to the supporting wire 27, and the guiding member 30 loosely engages the related supporting wire 28. This arrangement efficiently maintains the grids in their correct spaced relation with respect to each other and with respect to the cathode and anode.

The two grids are formed so that the lateral wires are equally spaced from the cathode and anode, i. e., the lateral wires of one grid lie in the same plane as those of the other grid. The coplanar relation of the two grids is conveniently accomplished by alternating the respective turns of the grids so that the adjacent lateral wires in the same plane comprise interlaced wires of the two grids, i. e., so that the lateral wires of each grid lie in the same plane as those of the other grid and alternate with them. This can be done, for example, by winding the two grids as shown in Figs. 2 and 2—A on separate mandrels, the grid 23 being wound on a thin mandrel and the grid 24 on a thicker mandrel. The grid 24 is then removed from the mandrel and the contour of this grid is shown in Fig. 2—A. The next step of fabricating the two grids is the insertion of grid 23, which is still maintained on the winding mandrel, into the larger grid 24 which has been removed from the mandrel. This relation is shown in Fig. 2—A in which the smaller grid 23 is shown in dotted outline within the larger helix of the grid 24. After the grids have been coaxially positioned with their lateral wires in parallel relation the grid 24 is pressed between plates so that the wires of the grid 24 in the flat planes are brought into alignment with the wires in the flat planes of the grid 23. The form of the grids after the pressing operation is shown in Fig. 3. It will be seen from Fig. 1 that the adjacent lateral turns 31 and 32 of grid 23 alternate with the adjacent lateral turns 33 and 34 of grid 24 and are equally spaced from each other and lie in two parallel planes with the adjacent wires of the two grids on one side being in coplanar relation.

Fig. 5 shows another method of fabricating the two grids by winding the grid 23 on a contracting mandrel 35 and after the grid has been welded to the supporting wires 25 and 26, enlarging members 36 and 37 are applied to the curved edges of the mandrel 35 and the wound grid 23 and carry the supporting wires 27 and 28. The grid 24 is then wound over the enlarged mandrel and welded to the supporting wires 27 and 28. The mandrel is then removed from the composite structure by removing the wedge 38 from the mandrel 35 and the grids 23 and 24 may be slipped off the forms.

The flat type electrode structure of the discharge device 10 affords large electrode surfaces between which electrons may flow, with relatively small inter-electrode spacing, and is thus well adapted for large power output.

Fig. 6 shows the space discharge device 10 connected to repeat waves from incoming circuit 40 and transformer 42 into output transformer 43 and circuit 41. Negative biasing potential $E_c$ can be supplied to the control grid 23 in any suitable manner, as for example by a battery 47 or other source of direct potential connected in circuit between the filament and the control grid as usual in vacuum tube circuits. Potential $E_s$ can be supplied to the other grid 24 for example by a battery 48 or other source of direct potential having its negative pole connected to the filament and its positive pole connected to that grid. Plate potential $E_b$ can be supplied to the plate in any suitable manner, as for example by a plate voltage supply battery or generator 46 connected in circuit between the filament and plate as usual in vacuum tube circuits.

As seen from the following table of observed values facilitating comparison of the performances of a coplanar grid tube of the type described above and other types of tubes, the coplanar grid tube operating with high values of input and control grid biasing and space-charge grid biasing potentials gives markedly greater output power of given quality (as gauged by harmonic levels) than the other types of tubes, for the same values of plate potential and total space current:

| Type of tube | $E_b$ | $E_s$ | $E_o$ | $I_t = I_b + I_s$ (Space current) | $R_R$ | $\frac{R}{R_p}$ | $\mu$ | Gain (db.) | Power (mw.) | $F_2$ | $F_3$ | Input, v (Peak volts) |
|---|---|---|---|---|---|---|---|---|---|---|---|---|
| 101-D | 130 | | −9 | 8 | 6000 | 1 | 5.9 | 29.5 | 60 | 26.3 | 48 | $v=E_c$ |
| 101-D | 130 | | −13 | 4.5 | 7500 | 1 | 5.7 | 28.0 | 85 | 20 | 40 | $v=E_c$ |
| 101-D | 200 | | −21 | 9 | 5800 | 1 | 5.8 | 28.9 | 280 | 20 | 38 | $v=E_c$ |
| 104-D | 130 | | −20 | 23 | 2000 | 1 | 2.5 | 26.8 | 160 | 25 | 50–55 | $v=E_c$ |
| 104-D | 130 | | −32 | 12 | 2900 | 1 | 2.3 | 24.8 | 265 | 20 | 40–50 | $v=E_c$ |
| 104-D | 200 | | −49 | 23 | 2300 | 1 | 2.3 | 25.7 | 750 | 20 | 40–50 | $v=E_c$ |
| Optimum three-electrode tube | 130 | | −25.3 | 19.5 | 1600 | 1 | 3.0 | 29.0 | 440 | 20 | 38 | $v=E_c$ |
| Optimum three-electrode tube | 130 | | −30 | 12 | 2000 | 1 | 2.9 | 28.0 | 470 | 16 | 32 | $v=E_c$ |
| Positive inner grid | 130 | 20 | −54 | 22.5 | 3300 | 1 | 2.1 | 22.7 | 460 | 20 | 32 | $v=E_c$ |
| Positive inner grid | 130 | 15 | −42 | 19.5 | 4000 | 1 | 2.25 | 22.8 | 280 | 26 | 39 | $v=E_c$ |
| Co-planar grid tube | 130 | 80 | −64.5 | 23 | 3700 | 1 | 3.3 | 25.3 | 1,170 | 22.5 | 21 | $v=E_c$ |
| Co-planar grid tube | 130 | 60 | −49 | 23 | 3300 | 1 | 3.25 | 27.1 | 1,060 | 21 | 27.5 | $v=E_c$ |
| Co-planar grid tube | 130 | 40 | −34.5 | 23 | 2700 | 1 | 3.6 | 28.8 | 740 | 22 | 36 | $v=E_c$ |
| Co-planar grid tube | 130 | 40 | −35 | 23 | 2700 | 1 | 3.6 | 28.9 | 400 | 25 | 42 | 25 volts |
| Co-planar grid tube | 250 | 93 | −90 | 55 | 2175 | 2 | 3.35 | 27.7 | 3,950 | 26.5 | 29 | $v=E_c$ |
| Co-planar grid tube | 180 | 76 | −70 | 33.3 | 2780 | 2 | 3.3 | 26.4 | 1,800 | 32 | 26 | $v=E_c$ |

In the table, $F_2$ and $F_3$ are the output power levels of the second and third harmonics expressed in db. below the output level of the fundamental wave, db, signifying the well known unit, decibels, for expressing transmission efficiencies and power levels. The current $I_t$ is the total space current, $I_b$ being the plate current, and $I_s$ being the current to the space-charge grid. $R_p$ is the plate resistance of the tube, and R the external output impedance (resistance), attached to the tube.

The 101-D and 104-D tubes of the table are the Western Electric Company 101-D and 104-D (three-electrode) vacuum tubes. The data taken for them at 200 volts plate potential is for a plate potential above their normal operating potential, but is included to illustrate the effect of increase in plate voltage on the output power of a given quality.

Figure 8:
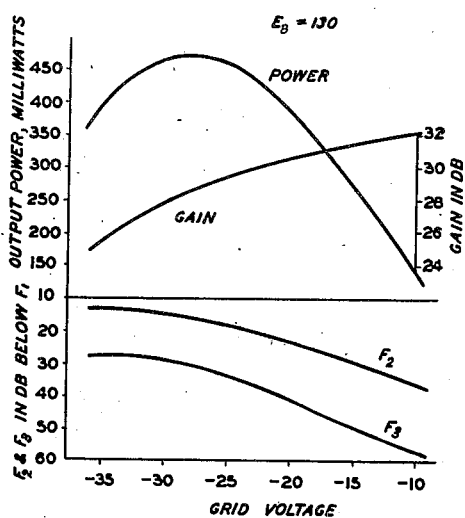

The positive inner grid tube of the table is the one referred to hereinafter; and the optimum three-electrode tube of the table is the tube whose characteristics are shown in Figs. 7 and 8 described hereinafter.

Regarding the significance of the expression optimum three-electrode tube, in the case of three-electrode tubes a sufficiently exact theoretical analysis is possible to permit the design of structures closely approximating the optimum obtainable from the standpoint of giving the maximum output power of a given quality available at any given plate voltage and plate current.

Such computations show that no very substantial increase in output power of like quality could be obtained by a change in design, over that now obtained from the 101-D and 104-D tubes under the given operating conditions. The gain, however, could be increased without sacrifice of output power or quality. With the second harmonic fixed at 20 db. below the fundamental, similar computations show that the output power could be greatly increased. For example, with the plate current fixed at 23 ma., by a change in design, an output power of about 450 mw. could be obtained as compared with 265 mw. from the 104-D tube. Data obtained from such a tube will be shown hereinafter.

Unfortunately, in the case of multiple grid tubes, particularly when one of them is held at a positive potential, there is no sufficiently, exact theoeretical analysis yet available to permit the determination of the parameters of optimum tubes, as there is in the case of three-electrode tubes. It has been necessary, therefore, to follow qualitative considerations largely in the design of such tubes, and to cover experimentally fairly wide variations in structural parameters.

Tests were made on positive inner grid tubes having electrode structures of flattened cylindrical form containing the usual type of wound grids that are readily made commercially. A number of variations were made in the spacing of the plates and grids, and in the size, number, and arrangement of the lateral wires in each grid. The data on the positive inner grid tube in the table was obtained for one of the best structures found. It contains the same filament and is therefore capable of operating at the same total space current as the 104–D tube.

Now the available output power will depend on the quality specified. Without attempting to define the quality required, let us arbitrarily adopt as a basis of comparison the criterion that the percentage of second harmonic cannot be greater than that corresponding to 20 db. below the fundamental. This is a higher percentage than could be permitted in many cases, and perhaps is as high as could be tolerated in almost any practical application.

For the positive inner grid tube considered, the 20 db. limit is reached at a grid potential of −54 volts and a positive grid potential $E_s$ of 20 volts, which is about as high a value of the latter as could be chosen without exceeding the space-current limitation. Under this condition the sum of plate and positive grid currents is 22.5 ma., which is within the proper range for the filament of the 104—D tube. The plate resistance is 3300 ohms and the value of $\mu$ is 2.1. The output power under these conditions is 460 mw. The gain is 22.7 db., determined under the standard conditions for repeater tubes. These conditions, which apply to all of the values of gain given in this specification, are that the tube work into a resistance load, R, equal to its own plate-filament resistance, $R_p$, and that the input circuit have a resistance of 600,000 ohms.

Let us compare this output power with that from an optimum three-electrode tube designed to operate at a plate potential of 130 volts, a plate current of 23 ma., and giving the maximum output power obtainable with the second harmonic 20 db. below the fundamental. As previously indicated, the computed output power of such a tube is about 450 mw.

The characteristics of a tube very close to the optimum in output power under these conditions are shown in Figs. 7 and 8. This is the optimum three-electrode tube of the table above. The plate and grid spacing were made as small as practicable in tubes the electrical characteristics of which must be maintained within the relatively close limits required in telephone repeater tubes. This tube operates at the proper level of second harmonic with the grid at −25.3 volts, at which point the power output is 440 mw. The gain under this condition is 29 db. Comparison with the results obtained for the space-charge-grid tube shows that the power output is nearly the same for the two structures, although the gain obtained with the optimum three-electrode tube is 6.3 db. higher.

In Fig. 8, $v=E_c$ and $R=R_p$.

While it is possible that some improvement might be obtained by a change in electrical parameters from those of the positive inner grid tube the characteristics of which are given above, or by structural changes, it is not believed that any very substantial increase in output power of like quality can be obtained by such means, at least under the imposed limitations of space current and plate voltage. Confirmation of this view is had in the results obtained with certain variations in structures tried.

The results of these and other experiments lead to the conclusion that there is a more fundamental reason for the limitation in output power from such tubes. They are essentially low-voltage high space-current tubes, and are not particularly efficacious at the voltage and comparatively low space currents considered here. Over a limited range of operation they have a low impedance and, consequently, are capable of giving a high gain. When tubes of this type are designed to operate over a wider range, as they must be for large output power, they are much less efficient. Under this condition the effective plate resistance increases and the positive grid is of little service or may even render the tube less effective than a well-designed three-electrode tube. Better results were obtained with the coplanar grid structure described above, which is essentially free from these limitations.

Considering now this coplanar grid type of tube and its characteristics, in the case of these tubes, as in the case of other types of tubes with positive grids, it has been necessary to follow qualitative considerations in their design, so that the structural parameters necessary for the best design are not as yet very well defined. In agreement with theoretical considerations, the tube resistance, and consequently, $\mu$ should be low for large power output. At the same time there is an advantage in having the lateral wires of the negative control grid shield those of the positive grid as well as possible when the former swings to large negative potentials. These opposing requirements cannot be wholly satisfied, but obviously are the most nearly so by the use of small diameter lateral wires fairly closely spaced. On the other hand it is necessary to use lateral wires large enough to maintain the grid form. The narrower grid is used as the control grid, because a larger current is collected by the unshielded portion of the positive grid if the arrangement is reversed.

Figure 9:
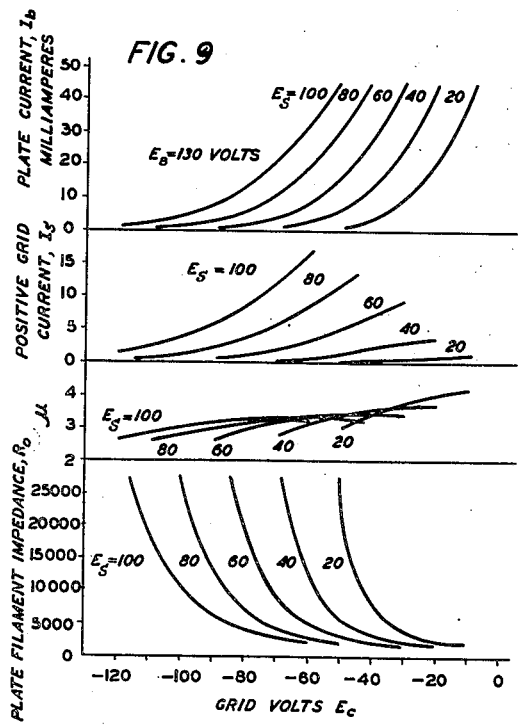
Figure 10:
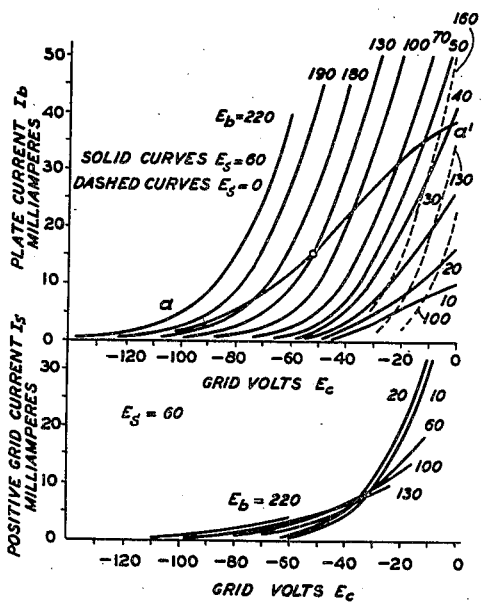

Static characteristics for a typical tube of this type, the coplanar grid tube of the above table, are shown in Figs. 9 and 10. The plate spacing in this particular tube is 0.200 inch, and the spacing of the grids 0.090 inch. The lateral wires in both grids are 0.005 inch in diameter, wound with 12.9 turns per inch. The curves of Fig. 9 are for $E_b=130$ volts. In Fig. 10 are shown families of plate current and positive grid-current curves as functions of $E_c$ with the positive grid voltage $E_s$ fixed at zero and 60 volts as parameters. It is apparent from these curves that one of the chief effects of increasing the positive grid voltage is to move the families of plate current characteristics to the left. This displacement is equivalent in effect to an increase in plate voltage and is roughly proportional to the increase in $E_s$. This approximation is closer if we consider the total space current to both the plate and positive grid rather than that to the plate alone.

In fact we may write as a rough approximation of the characteristics over a considerable portion of their range, $$I_t = I_b + I_s = K(E_b + \mu_s E_s - \mu E_c)^{3/2} \quad (1)$$

in which $I_t$ is the total space current, that is, the sum of the plate and positive grid currents, $I_b$ and $I_s$, respectively; $K$ is a constant depending on the values of $\mu_s, \mu$ and the dimensions of the tube; $\mu$ is the usual amplification factor pertaining to the control grid, and $\mu_s$ a similar factor pertaining to the positive grid. In a tube in which the two grids are symmetrical one might expect that $\mu_s$ and $\mu$ would be equal, but such is not the case although at the higher values of $E_s$, at least, the ratio of $\mu_s$ to $\mu$ is nearly constant when $I_t$ is held constant. The variations in $\mu_s$ and $\mu$ are complex in character and space does not permit a detailed discussion of them here. In general, $\mu$ decreases and $\mu_s$ increases with decreasing values of $I_t$; but the magnitude of these variations, at least when $E_b$ is greater than $E_s$, does not seem to be greater than in ordinary three-electrode tubes.

Obviously, this equation does not take into consideration the distribution of the total current $I_t$ between the plate and positive grid, which it would be necessary to do in order to formulate the characteristics with sufficient accuracy to permit the computation of the harmonic output. However, some of the characteristics of the tube are made clearer by reference to the above equation. For example, if the operating plate voltage $E_b$ and the total space current $I_t$ are fixed, then as larger values of positive grid voltage $E_s$ are chosen the corresponding values of control-grid voltage $E_c$ must be made proportionately more negative. We have already seen from the curves of Figs. 9 and 10 that this is the case, qualitatively at any rate. Computation shows that is also holds quantitatively to a fair approximation if the variations in $\mu$ and $\mu_s$ are taken into consideration. Since the peak value of the allowable input voltage increases with the absolute value of $E_c$ the output power should, therefore, increase with $E_s$.

Or, so far as total space current is concerned, we might regard Equation (1) as that of an equivalent three-electrode tube in which the plate voltage $E_b$ is replaced by the effective plate voltage $E_b + \mu_s E_s$, an increase proportional to $E_s$ as was indicated above.

Looked at from a slightly different angle, there is another reason why one should expect such a structure to give a greater power output than can be obtained from ordinary three-electrode tubes under comparable conditions. Under the limitation that the grid shall not be carried positive the latter are low in efficiency as power converters from the standpoint of the ratio of useful output power to that dissipated in the plate when no input is applied. One reason for this is, that at the instant when the grid is at zero potential, a large portion of the available voltage in the plate circuit must be consumed in drawing the peak current from the tube, only the remainder being available as the peak value of useful voltage across the load resistance. That is, $$E_b = E_{po} + iR = E_{po} + (I_{po} - I_b)R \quad (2)$$

in which $E_{po}$ and $I_{po}$ are respectively the values of plate potential and plate current at the instant when the grid is at zero potential. $E_{po}$ is always a very considerable fraction of $E_b$.

Now in the coplanar grid tube the fixed component $\mu_s E_s$ of equivalent plate voltage contributes a large portion of the potential across the tube (corresponding to $E_{po}$) necessary to draw the required current at the instant when the grid potential is zero. Consequently a larger proportion of $E_b$ is available as useful voltage-drop across the load resistance than in three-electrode tubes. This means increased output power.

On the other hand, there is no way of telling definitely from the curves as to what the relative levels of harmonics may be. The plate current characteristics of Fig. 10 show a marked flattening or even a dropping off for values of $E_b$ lower than $E_s$ as $E_c$ approaches zero. This is due to the larger fraction of the total current collected by the positive grid under these conditions. This also produces a flattening out of the dynamic characteristic in this region, as is shown by the curve $a\ a'$ which is a dynamic characteristic drawn through the operating point, $E_b = 130$ volts, $E_s = 60$ volts and $E_c = -53$ volts, for a resistance load equal to the plate resistance of the tube. The effect of this flattening of the dynamic characteristic is to reduce the second harmonic although the third may be increased relatively.

Figure 11:
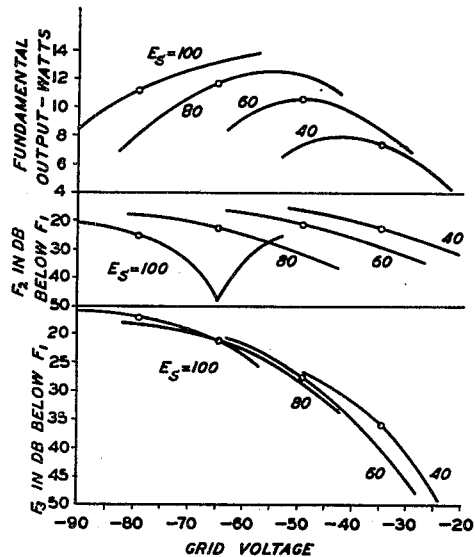
Figure 12:
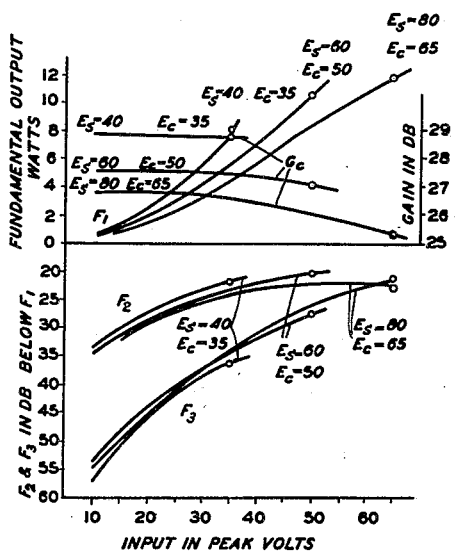

These conclusions are quite well confirmed by the curves of Fig. 11 in which the fundamental output power, second and third harmonics are plotted as functions of the control-grid voltage $E_c$. These data were obtained under the same conditions as those previously given for other tubes. $E_b = 130$ volts; $v = E_c$; and $R = R_p$. The points on the curves marked by circles represent conditions for which the total space current, $I_b + I_s$, is 23 ma., so that values at these points are directly comparable with those previously considered for other tubes. In Fig. 12 some of the same data are plotted as functions of peak input voltage with $E_s$ 80, 60, and 40 volts as parameters, and for selected values of $E_c$ such that the total space current $I_t$ (at zero input) is very nearly 23 ma. Gain curves for the same conditions are also included. $E_b = 130$ volts.

With $E_s$ at 100 volts the total space current $I_t$ reaches 23 ma. at a grid voltage of $-79$ volts. At this point the output power is 1.11 watts with the level of the second harmonic 25 db. below that of the fundamental. On the other hand the third harmonic is only 17 db. below the fundamental. So that, if we extend our criterion of the lowest permissible quality to include the condition that the third as well as the second harmonic must be limited to 20 db. below the fundamental, this condition of operation must be rejected. The reason for the relatively high level of the third harmonic as compared with the second is found in the peculiar form of the characteristics as discussed above. With $E_s$ at 80 volts the output power is 1.17 watts with the second and third harmonics 22.5 and 21.0 db. below the fundamental, respectively. The gain under this condition is 25.3 db. The output power and third harmonic are progressively lower at the 23 ma. points on the curves for lower values of $E_s$, while the second harmonic remains at about 22 db. Under the same limitation as to second harmonic the output power obtainable from this tube is about 2.5 times that from either the optimum three-electrode tube or from the tube with positive inner grid. On the other hand the third harmonic is considerably higher than for either of the other tubes.

Now suppose a three-element tube be designed to give the maximum possible output power with a plate current of 23 ma. and without regard to quality. Computations show that such a tube would have a power output of about 850 mw. with the second harmonic about 16 db. below the fundamental. Hence, it is clear that this coplaner grid tube, which it cannot be assumed represents an optimum, gives a larger output power at a lower level of second harmonic (although not of third) than is possible in any three-electrode tube of the ordinary type, subject to the imposed limitations as to grid swing and space current.

Let us consider the output power of the coplanar grid tube at a level of second harmonic comparable with that of the 104—D tube when working under the conditions previously given. The output for the 104—D tube is 160 mw. with the second harmonic 25 db. below the fundamental. Under this condition the third harmonic is very low, of the order 55 db. below the fundamental, (curves not shown), and also extremely variable from tube to tube. This is caused by a partial balance of components of opposite phase due to curvature of the plate-current characteristics and to variations in $\mu$. From the curves of Fig. 12 it is found that, with $E_s$ at 40 volts, $E_c$ at −35 volts and with a peak input of 25 volts the coplanar grid tube gives a power output of 400 mw. with the second and third harmonics respectively 25 and 42 db. below the fundamental. This value of output power is 2.5 times that of the 104—D tube under comparable conditions. By a redesign it might be possible, in a tube similar to the 104—D tube, to increase the output power to about 200 mw., but even so the coplanar grid tube would deliver twice as much power under comparable conditions.

Figure 13:
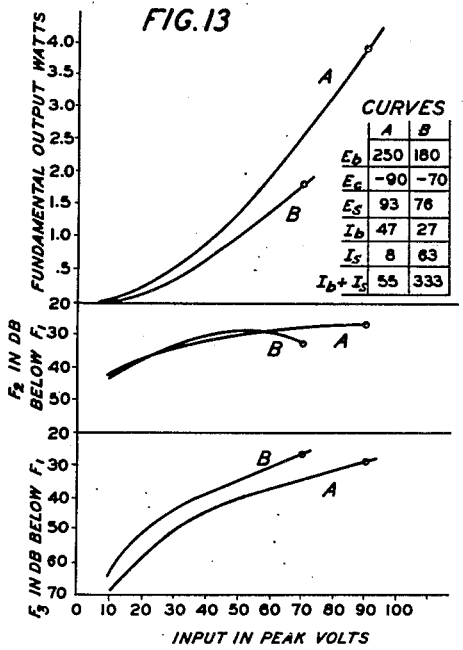

Let us now remove the restrictions as to plate potential and plate current that we have thus far applied (except as indicated in the table above), and consider the output power from the coplanar grid tube at higher plate voltages and plate currents. The frequently used conditions will be assumed to apply, that the load resistance be made equal to twice the plate resistance of the tube and that the second harmonic be limited to five per cent, that is 26 db. below the fundamental. Curves giving the output power and harmonics as functions of peak-input voltage are shown in Fig. 13. The curves marked (A) are for a plate potential of 250 volts and for a total space current of 55 ma. The maximum output power, (indicated by circle) determined by a peak-input voltage equal to $E_c$, is 3.95 watts with the second and third harmonics respectively 26.5 and 29 db. below the fundamental. It will be observed that the second harmonic falls off very slowly with decreasing input, while the third harmonic falls off quite rapidly.

The curves marked (B) show similar results for a plate potential of 180 volts and a total space current of 33.3 ma. The maximum output power in this case is 1.8 watts with the second and third harmonics respectively 32 and 26 db. below the fundamental. Here the percentage of second harmonic actually increases for a time with decreasing input, reaching a maximum of 29 db. The reason for this and also for the relatively high value of third harmonic, as previously explained, is found in the bending over of the dynamic characteristic at low values of grid voltage. (See Fig. 10.) The plate voltages, at which the above values of output power are obtained, are 60 to 70 per cent of the plate voltages necessary in three-electrode tubes to give the same power output at the same space currents and the same levels of second harmonic. The third harmonic is higher in the coplanar grid tube, however, for reasons given.

Figure 14:
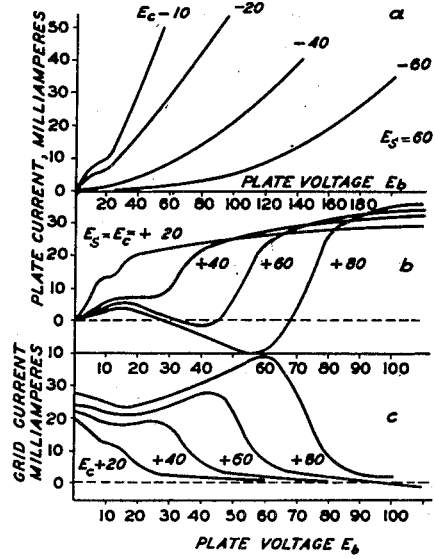

Some of the reasons for the comparatively large output power from the coplanar grid tube have already been discussed. But it also has some other features that are of interest. One of these is the phenomenon of secondary electron emission. One might expect the situation to be similar to that in tubes with the outer grid positive in which the range of operation is seriously restricted by secondary electrons from the plate to the positive grid when the potential of the former is less than that of the latter. That this restriction does not apply in this case is evident from the curves of Fig. 14 in which plate current is plotted against plate potential for $E_s = 60$ volts and for several values of $E_c$. There is no apparent distortion as the plate potential passes through a value equal to that of the positive grid, i. e., 60 volts. For the lower grid voltages there is some distortion at plate potentials between 15 and 20 volts. This point will be discussed later. That the plate does emit a copious number of secondary electrons is shown by the curves $b$ and $c$ of Fig. 14. In this case both grids are held at the same positive potential and the filament current adjusted to limit the total space current to approximately 30 ma. Here the effects of secondary electrons are very pronounced, the plate current falling off very greatly as the decreasing plate potential passes through a value equal to that of the positive grids. The complementary character of the corresponding curves $c$ of Fig. 14 giving the current to the positive grids shows that the secondary electrons emitted from the plate are collected by them.

The reason for the small number of secondary electrons from the plate to the positive grid under normal conditions is evidently due to the shielding of the latter by the field of the negative control grid. This may be illustrated as follows: suppose the plate to be at a potential of 30 volts, the positive grid at 60 volts, and the negative control grid at −40 volts. Then one may think of the resultant electric field between the grid plane and the plate as that produced by the superposition of two components, one directed toward the plate due to the 30 volts difference between the plate and positive grid, and an oppositely directed component due to the 70 volts difference between the negative grid and the plate. Obviously the latter must prevail and electrons from the plate find themselves in an opposing field. At low plate potentials, with the negative control-grid potential approaching zero and with high potentials on the positive grid, the shielding of the latter is so much reduced that it may collect secondary electrons from the plate. This condition accounts for the humps on the curves $a$ of Fig. 14 at plate potentials between 12 and 20 volts. This effect may reduce the net plate current somewhat in this region but not enough to impair the functioning of the tube. The effect increases somewhat with increasing values of positive grid potential.

*Other advantageous features of the coplanar grid tube*

Another advantageous feature of the coplanar grid tube is that by placing the two grids in the same plane the necessary spacing between the filament and the plate is reduced to a distance comparable with that in three-electrode tubes, which is effective in reducing the tube resistance; and at the same time it eliminates a region between the two grids affected by space charge or excessive turbulence in the flow of electrons. In space-charge-grid tubes with the inner grid positive (as usually operated at any rate), a relatively large space current is drawn from the filament at all times. Part of this stream of electrons is collected by the positive grid; a varying proportion of the remaining stream which flows through the positive grid, depending on the instantaneous potential of the negative control grid, passes through the latter to the plate; the remaining electrons are turned back by the control grid eventually to be collected by the positive grid. The latter thus collects not only the stream of electrons flowing directly to it, but also a reverse stream which increases as the control grid reduces the current to the plate.

While in the coplanar grid tube a positive grid is provided, as in other tubes containing space-charge grids, to partially neutralize the opposing field due to space charge near the filament, yet this effect is limited by the varying potential of the negative control grid in the same plane. By this dual control of the space-charge effect the action of the positive grid, when the tube is in operation, is neutralized by the field of the control grid when the latter is near the most negative point in its swing and but little space current is drawn away from the filament. As the control grid approaches zero potential, the field of the positive grid becomes more effective in reducing the space-charge field near the filament during that portion of the cycle when a large space current is required. Consequently, at any time only that number of electrons is drawn away from the filament that is necessary to supply the currents flowing directly to the plate and positive grid at the particular instant. In this case there are no reversed currents to the positive grid. Therefore, in comparable structures the coplanar grid tube requires smaller average values of space current than positive inner grid tubes.

Another application of the coplanar grids is the dual control of the output current by the separate controlling action of the two grids. This double control may be utilized even when one of the grids is positively charged. In this case the amplification constant of the two grids can be made approximately equal which is impractical with other double grid devices.

In the claims, the term "wire" is used as generic to a conducting ribbon, strip or thread having any shape of cross-section.

What is claimed is:

1. A circuit comprising a vacuum tube having a cathode, an anode, a control grid and a space-charge grid in substantially the same space relation as said control grid with respect to said anode and said cathode, means for applying a positive potential of as much as one hundred volts to said anode, means for applying a negative biasing potential of as much as twenty volts to said control grid, means for applying a varying potential to said control grid, and means for applying a positive biasing potential of as much as twenty-five volts to said space-charge grid, said potentials having such values and each of said grids having its parts so located relatively to the parts of the other grid with respect to said cathode and said anode that when the potential of said control grid is near its most negative value the control grid effectively neutralizes the action of the space-charge grid in reducing the field due to space-charge near the cathode and shields the space-charge grid, and when the control grid potential is near its closest approach to zero the space-charge grid effectively reduces the space-charge field near the cathode.

2. A circuit comprising a vacuum tube having a cathode, an anode, a control grid and a second grid in coplanar relation therewith, an impedance connected between said cathode and said anode, means for applying a steady positive anode potential to said anode, means for applying a steady positive potential to said second grid, means for applying a steady negative potential to said control grid, and means for applying to said control grid a potential causing said anode to assume potentials higher and lower than said positive potential applied to said second grid.

3. A circuit comprising an electric space discharge device having a cathode, an anode, a discharge control grid and a second grid in substantially the same space relation as said control grid with respect to said anode and said cathode, means for applying a steady positive potential to said second grid, means for applying to said control grid a steady negative potential of as much as twenty volts and as great as three-fourths of said positive potential, and means for applying a varying potential to said control grid.

4. A circuit comprising a vacuum tube having a cathode, an anode, a control grid and a second grid in coplanar relation therewith, means for applying a steady positive anode potential to said anode with respect to said cathode, means for applying to said control grid a potential varying with respect to said cathode, means for applying to said second grid a steady positive potential with respect to said cathode equal to at least a quarter of said anode potential, and means for applying to said control grid a steady negative potential with respect to said cathode equal to at least a fifth of said anode potential.

5. A circuit comprising an electric space discharge device having a cathode, an anode, a discharge control element and a second element, means for applying to said second element a positive potential for reducing the field due to space charge near said cathode, means for applying a steady positive anode potential of at least 100 volts to said anode, means for applying a varying potential to said first element, and means for applying to said first element a steady negative potential at least one-fifth as great as said 100 volts, each active elementary area of each of said two elements being at substantially the same location as a corresponding active elementary area on the other of the two elements with respect to said cathode and said anode.

6. A circuit comprising a vacuum tube having a cathode, an anode, a control grid and a second grid in coplanar relation therewith, means for applying a varying potential to said control grid, means for applying a positive potential as great as twenty-five volts to said second grid, and means for applying a steady negative potential of at least twenty volts to said control grid.

7. A circuit comprising a four electrode vacuum tube having a cathode, an anode, a control grid and a space-charge grid coplanar therewith, means for applying an anode potential as great as one hundred volts to said anode, means for applying to said grids, respectively, negative and positive biasing potentials as great as one-fifth of said anode potential, and means for applying to said control grid varying potential which, in cooperation with said other potentials, generates output levels of second harmonic and third harmonic approximately equal and within thirty decibels of the output level of the fundamental.

8. A vacuum tube circuit comprising a power amplifier tube having a cathode, an anode of flattened cylindrical form surrounding said cathode, and a pair of wire wound grids between said anode and said cathode, an input circuit connected between said anode and one of said grids for applying to said grid waves to be amplified by said tube, an output circuit connected between said anode and said cathode, means for applying to said anode a steady positive anode potential of at least one hundred volts, means for applying to said one grid a steady negative potential of value at least one-fifth of said positive anode potential, and means for applying to said other grid a steady positive potential as great as one-quarter of said anode potential, said grids having the same contour as said anode and both grids having their lateral wires between opposing sides of said cathode and anode in a single plane.

HOWARD A. PIDGEON.
JAMES O. McNALLY.